United States Patent Office 3,349,617
Patented Oct. 31, 1967

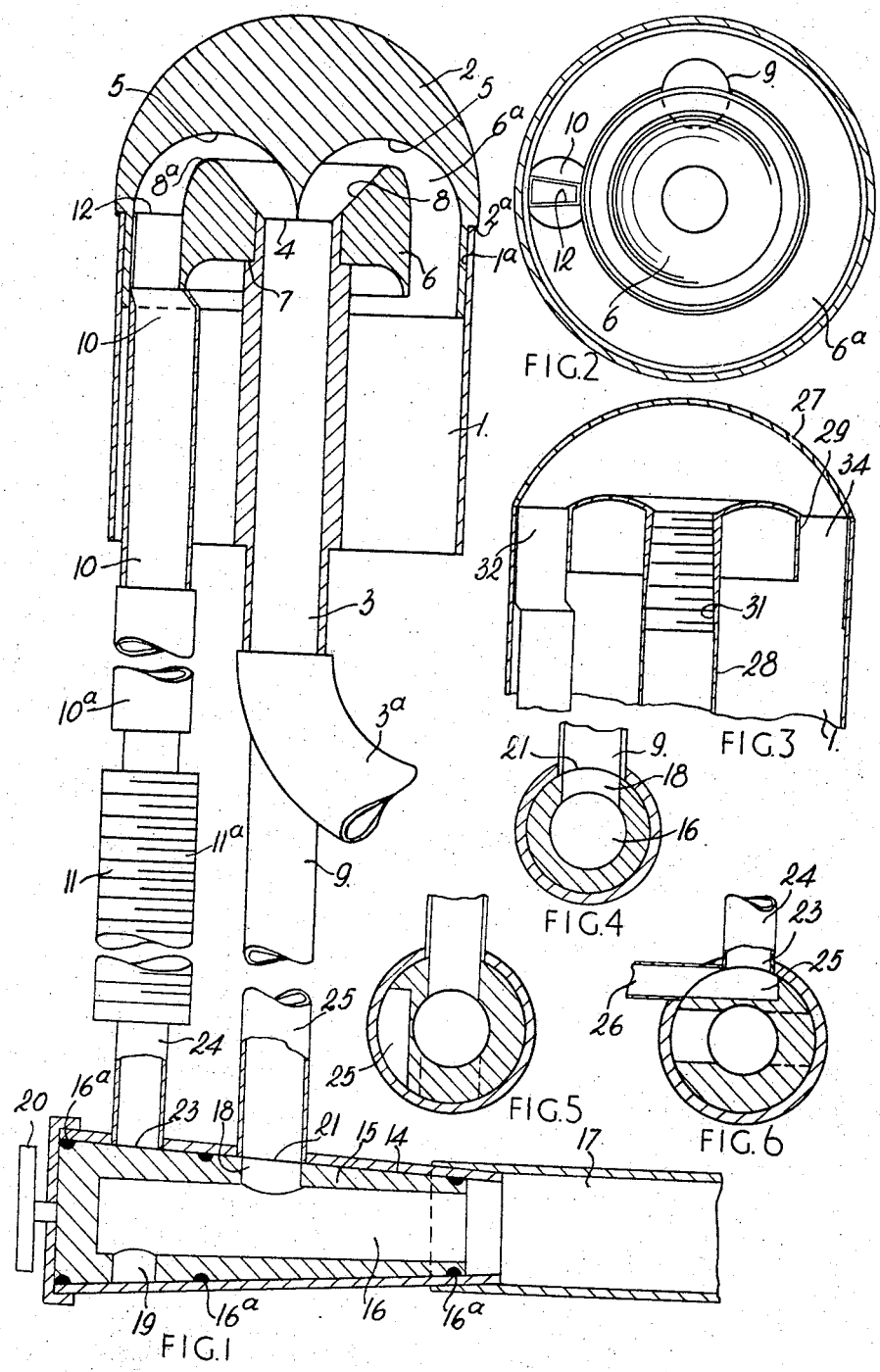

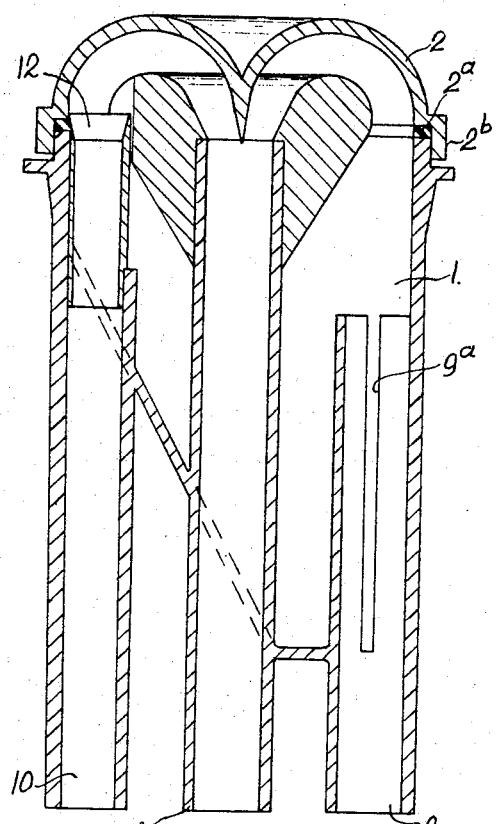
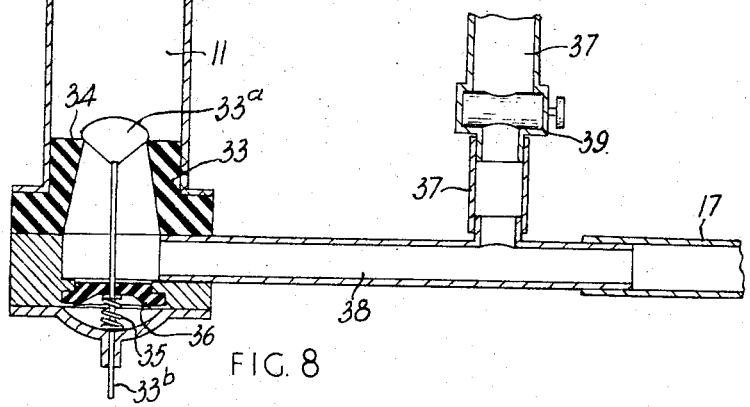

3,349,617
METERING AND FLOW INDICATING DEVICE
FOR USE DURING MILKING
John Lewis Hartstone, R.D. 5, Otorohanga,
Hamilton, New Zealand
Filed Jan. 12, 1965, Ser. No. 424,963
11 Claims. (Cl. 73—202)

ABSTRACT OF THE DISCLOSURE

A metering and flow indicating device for use during milking operations in which an open top chamber is adapted to communicate with a milk supply from a milking machine system and a milk distributing means located within the chamber spreads the milk in an evenly downwardly directed flow onto the inner wall of the chamber. A metering cup is positioned about the entrance to the chamber outlet with the area of the cup being of a selected ratio relative to the cross-sectional area of the interior of the chamber whereby a selected amount of milk passes through the cup to a graduated scale for indicating the weight of the milk taken from the cow.

The invention relates to a metering and flow indicating device used during milking to indicate the flow of milk and weight of milk produced by a cow during milking.

The primary object of my invention is to provide an improved metering and flow indicating device for use during milking operations, the improved device being of simple construction and combining a metering and a flow indicating arrangement so that not only is the flow of milk indicated to the operator but in addition the milk may be measured so that the milk capacity of the cow can be readily observed during or at the completion of the milking operation.

According to one aspect of the invention the improved metering and flow indicating device for use during milking operations comprises a cylindrical chamber connected to a supply of milk, an outlet leading from the chamber, milk distributing means within the chamber and capable of passing the milk in an evenly distributed flow on to the interior wall of the chamber, a metering cup set about the entrance to an outlet opening from the chamber, the area of the metering cup being of a selected ratio relative to the cross sectional area of the interior of the cylindrical chamber, so that a selected quantity of milk is passed through the metering cup to a graduated scale to indicate the weight of the milk taken from the cow.

According to a second aspect of the invention, the improved metering and flow indicating device for use during milking operations comprises a cylindrical chamber, an inlet pipe leading into the chamber and adapted to be connected to a supply of milk from a milking machine system, an outlet leading from the chamber, an annular space formed about the inner end of the inlet pipe between a collar mounted about the inlet pipe and the inner surface of the cylindrical wall of the chamber, milk distributing means situated within the chamber and capable of spreading the milk discharging from the inlet pipe in an evenly, downwardly directed flow through the annular space and a metering cup set about the entrance to a discharge pipe leading from the chamber to a measuring glass, the area of the entrance to the metering cup being of a predetermined ratio relative to the area of the annular space so that a selected quantity of milk is passed through the metering cup and discharge pipe to the measuring glass for the purpose of measuring the weight of the milk within the measuring glass against a graduated scale.

The invention will now be described with the aid of the accompanying drawings in which:

FIG. 1 is a view partly in elevation and partly in cross section of one form of the invention.

FIG. 2 is a plan view partly in section of FIG. 1.

FIG. 3 is a fragmentary view partly in elevation and partly in cross section of an alternative form of the invention.

FIGS. 4, 5 and 6 are detail views in cross section of a valve used in conjunction with the device for controlling the discharge of milk from the device.

FIG. 7 is a modification of the invention in section.

FIG. 8 is a modification of the valve partly in section and partly in elevation.

As illustrated in the drawings, chamber 1 is of cylindrical formation with a closed bottom, and an open top end 1a closed by a removable closure 2 which can be formed of a transparent material. Seals 2a are provided about the joint between the closure 2 and chamber 1. An inlet pipe 3 extends upwardly through the closed bottom end of the chamber 1 and extends upwardly centrally within the bore of the chamber 1 to terminate at a point adjacent to, or in alignment with the top 1a of the chamber 1.

The inlet pipe 3 provides for the inflow of milk into the chamber 1 and co-operates with a milk distributing means to ensure of an even flow of milk on to the interior cylindrical wall of the chamber for metering purposes as will later be described.

To particularize further on this aspect of the invention, in the form of the invention illustrated in FIG. 1, the milk distributing means includes an inverted conical-like protuberance 4 which is formed centrally on concave curved undersurface 5 of the removable closure 2 (see FIG. 1). More specifically, the circular wall of the protuberance 4 is also of concave formation, and forms a continuation of the concave curved undersurface 5 of the closure 2 (see FIG. 1). As illustrated, the protuberance 4 is positioned directly over and centrally of the open discharge end of the inlet pipe 3 and the tip or bottom end of the protuberance 4 is adjacent to, or in alignment with the discharge end of the inlet pipe 3.

As previously stated, the curved interior undersurface 5 of the closure 2 and the protuberance 4 act to deflect the flow of incoming milk discharging from the inlet pipe 3, outwardly on to the interior cylindrical wall of the chamber 1, and to assist in this deflection, a circular collar 6 is provided about the inlet pipe 3 so that an annular space 6a is provided between the outer surface of the collar 6 and the wall of the chamber 1 (see FIGS. 1 and 2). More particularly, the collar 6 is set on a rebate 7 on the exterior surface of the inlet pipe 3 and the bore of the collar 6 is inclined outwardly as at 8, and the incline 8 of the bore commences at the termination of the inlet pipe 3. The upper edge of the collar 6 is rounded as at 8a and, as illustrated in FIG. 1, terminates above the level of the protuberance 4. Thus, milk forced up the inlet pipe 3 under pressure from a milking machine system and discharging from the inlet pipe 3, is deflected outwardly to gravitate down the wall of the chamber 1 in a uniform flow through the annular space 6a.

As shown in the drawings the chamber 1 is provided with an outlet pipe 9 leading from the chamber 1 through the closed bottom of the chamber 1 and through which milk is discharged from the chamber 1 during collection of the milk for measuring purposes.

The chamber 1 also includes a second discharge pipe 10 which extends through the closed bottom of the chamber 1 projecting upwardly within the chamber 1. The discharge pipe 10 is positioned adjacent the wall of the chamber 1 and its lower end, which extends to the exterior of the chamber 1 is connected by a length of transparent piping 10a to a transparent and graduated sight and measuring glass 11. As illustrated, the upper end of the discharge pipe 10 is positioned a short distance below the top 1a of the upper and open entrance to the discharge pipe 10 and is constructed as a metering or measuring cup 12. To this end the metering cup 12 is positioned within the annular space 6a, and is formed as a separate component to the discharge pipe 10 and consists of a straight-sided but inwardly tapered component which forms the actual metering cup 12 which is slidably fitted into the annular space 6a and fitted on the open upper end of the discharge pipe 10. As illustrated in FIG. 2, the area of the opening into the metering cup 12 and the area of the annular space are corelated. For instance, the area of the opening of the metering cup 12 can be one fortieth of the area of the annular space 6a so that when the milk is distributed on to the interior wall of the chamber 1 by the distributing means, the milk gravitates down the cylindrical wall of the chamber 1 in an evenly distributed flow through the annular space 6a, so that one fortieth of the milk gravitating down the cylindrical wall of the chamber 1 is collected by the metering cup 12 and directed through the discharge pipe 10 to the measuring glass 11. The balance of the milk passes from the chamber 1 through the outlet pipe 9 to be returned to the milk line of the milking machine system.

The measuring glass 11 can be of any selected type and graduated in a manner enabling the weight of the fortieth part of milk diverted to the measuring glass 11 to be read off the scale, and enabling the weight of the milk to be ascertained at a glance.

The measuring glass 11 is also used in combination with a suitable turncock type valve which provides for the return of the milk passed through the chamber 1 to the milking machine system, or for the drawing off of the milk sample from the measuring glass 11. To particularize further on this aspect of the invention, the valve consists of a casing 14 and a spigot 15 turnable within the casing 14. The spigot 15 is rotatable within a bore 16 in sealing rings 16a which is open to one end of the casing 14, and the bore 16 is connected to a line 17 returning to the milking machine system. The valve spigot 15 is provided with two branch passages 18 and 19 therein leading from the outer surface of the spigot 15 to the bore 16. The spigot 15 can be turned by a handle 20 to a position whereby branch passage 18 is registered with an aperture 21 to which the outlet pipe 9 is connected to return the milk passing through the outlet pipe 9 to the return line 17. In such a position, the other branch passage 19 remains closed to a port 23 in the casing 14 and to which a dropper line 24 from the measuring glass 11 is connected (see FIG. 1). Conversely, when the spigot 15 is turned to connect the port 23 to the branch passage 19 to return the sample of milk in the glass 11 to the return line 17, the aperture 21 and branch passage 18 are out of registration and closed.

The spigot 15 is also provided with a by-pass passage 25 (see FIGS. 5 and 6) which can be placed in registration with the port 23 and an outlet 26 in the casing 14 to enable the contents of the measuring glass 11 to be drawn off when desired.

In an alternative form of the invention as illustrated in FIG. 3, a domed top closure 27 is provided and the interior surface of which is of concave formation to act as the milk distributing means as will now be described.

The inner end of inlet pipe 28 is provided with a collar 29 thereabout to form an annular space 30 between the collar 29 and the wall of the chamber. The inner end of the inlet pipe 28 is tapered inwardly and upwardly slightly and is formed with an internal screw-threading 31. The arrangement is such that when the milk is passed up the inlet pipe 28 and encounters the screwthreading 31, a swirling action is applied to the milk to assist or boost the milk from the inlet pipe 28 to ensure an even flow on to the concave undersurface of the closure 27 from which the milk is deflected downwardly in an even flow into the annular space 30 for collection by a metering cup 32 set in the annular space 30 as already described.

The improved milk metering device is of a capacity to operate from a milk output of say 5 gallons which is normally in excess of the milk output of a cow.

In operation, the milk supply line 3a leading from the teat cups (not shown) is connected to the inlet pipe 3 so that when the milking machine system is in operation, the full supply of milk from the cow is passed into the chamber 1. The spigot 15 having been turned to close off the port 23 leading from the measuring glass 11, and outlet aperture 21 opened via the bore 16 to the return line 17 to the main line of the milking machine system, milk from the teat cups is passed into the chamber 1. As previously described, a pre-determined quantity of the milk is diverted by the metering cup 12 into the measuring glass 11 while the remainder of the milk is return via outlet pipe 9, port 21, bore 16, to return line 17 and the main milk line. Upon completion of milking, the vacuum is released upon removal of the teat cups and the quantity of milk within the measuring glass 11 is read off against graduated weight scale 11a on the measuring glass 11.

In a preferred form of the invention, the metering and flow indicating device is mounted on a bracket (not shown) on the milk supply line 3a and attached by an adjustable bracket to the air line (not shown) of the milking machine system.

The improved device is clamped in position by a readily actuated clamp enabling the device to be quickly removed for cleaning purposes.

In the form of the invention illustrated in FIG. 7, the shape of the meter is varied and is formed of a transparent material. More particularly, the removable closure 2 fits neatly on rubber seal 2a on the chamber 1 with an outer skirt 2b of the closure 2 extending down the outside of the chamber 1. The inlet pipe 3, outlet pipe 9 and discharge pipe 10 leading to the measuring glass 11 extend below the bottom of the chamber 1 and are radially aligned. Furthermore, the inner end of the outlet pipe 9 extends upwardly into the chamber 1 for a distance and the section of the outlet pipe 9 located within the chamber 1 is slotted as at 9a. The size of the slot 9a and the length of the inner section of the outlet pipe 9 extending within the chamber 1 are calculated so that when a cow is milking at full capacity the level of the milk in the chamber 1 should rise to the top of the open end of the outlet pipe 9.

Again, the metering cup 12 can be removed from the inner end of the discharge pipe 10 and replaced by a plug (not shown), when the meter is required only as a visual flow indicator.

As illustrated in FIG. 8, the spigot type valve 15 is replaced by a spring loaded diaphragm valve generally indicated as at 33. More particularly, closure member 33a of the valve 33 is normally retained on a valve seating 34 by a spring 35 in compression between a diaphragm 36 and the housing of the valve thus closing off the measuring glass 11 to the return line 17 leading to the milking machine system. A stem 33b of the closure member 33a projects beyond the housing and by forcing the projecting end of the stem 33b inwardly of the valve 33 against the influence of the spring 35, the valve closure member 33a is lifted from its seating 34.

A line 37 leads from the outlet pipe 9 and joins into delivery line 38 of the valve 33 to which the return line 17 is detachably secured. The line 37 includes a turncock valve 39.

When it is desired to discharge the contents of the measuring glass 11 into the return line 17, the stem 33b of the valve closure member 33a is pressed upwardly against the compression of the spring 35 to allow the milk therein to flow into the return line 17 and into the milking machine system.

When it is desired to draw off the contents of the measuring glass 11, the turncock valve 39 is turned to close off the discharge of milk through the outlet pipe 9. The return line 17 is then detached from the end of the delivery line 38 to allow the milk from the measuring glass 11 to pass to a separate container.

The invention is not to be confined to any strict conformity to the showings in the drawings but changes or modifications may be made therein so long as such changes or modifications mark no material departure from the spirit and scope of the appended claims.

What I do claim and desire to obtain by Letters Patent of the United States of America is:

1. An improved metering and flow indicating device for use during milking operations comprising wall means defining a chamber having an open top, a closure for the open top, an inlet pipe leading into the chamber and adapted to be connected to a supply of milk from a milking machine system, an outlet leading from the chamber a collar mounted about the inlet pipe cooperable with the inner surface of the wall means to provide an annular space therebetween, milk distributing means situated within the chamber and capable of spreading the milk discharging from the inlet pipe in an evenly, downwardly directed flow through said annular space, said distributing means including a concave surface on the under surface of the closure, said concave surface having a central and downwardly extending protuberance positioned directly over the inlet pipe, said protuberance being of inverted conical formation and concave in shape thus forming a continuation of the concave undersurface of the closure, a measuring glass, a discharge pipe leading from the chamber to the measuring glass, an entrance to the discharge pipe, and a metering cup set about the entrance, the area of the entrance to the metering cup being of pre-determined ratio relative to the area of the annular space so that a selected quantity of mik is passed through the metering cup and discharge pipe to the measuring glass for the purpose of measuring the weight of the milk within the measuring glass against a graduated scale.

2. A metering and flow indicating device as claimed in claim 1 and wherein the internal wall of the collar is inclined outwardly and upwardly and surrounds the protuberance.

3. A metering and flow indicating device as claimed in claim 1 and wherein the area of the opening of the metering cup is one fortieth of the area of the annular space.

4. A metering and flow indicating device as claimed in claim 1 and wherein the closure seals are removable and is fitted about the open top of the chamber.

5. A metering and flow indicating device as claimed in claim 2 and wherein the upper edge of the collar is rounded.

6. A metering and flow indicating device as claimed in claim 1 and wherein the upper end portion of the bore of the inlet pipe is screwthreaded to increase the velocity of the milk discharging from the inlet pipe.

7. A metering and flow indicating device as claimed in claim 1 and including a valve for controlling the discharge of milk from the measuring glass and through the outlet pipe for return to the milking system, respectively.

8. A metering and flow indicating device as claimed in claim 7 and wherein the valve includes a spigot turnable in a casing, a bore of the spigot being connected to a return line to the milking machine system, and branch passages leading from the bore to the surface of the spigot, the spigot being capable of being turned to connect the outlet pipe from the chamber to the return line and close the remaining branch passage to the measuring glass, and turned to connect the branch passage to the measuring glass and close the branch passage to the outlet pipe.

9. A metering and flow indicating device as claimed in claim 8 and wherein spigot includes a by-pass, the said spigot being capable of being turned for connection to the measuring glass for drawing off of the contents of the measuring glass.

10. An improved metering and flow indicating device for use during milking operations comprising a chamber, an inlet pipe leading into the chamber and adapted to be connected to a supply of milk from a milking machine system, an outlet leading from the chamber, a collar mounted about the inlet pipe cooperable with the inner surface of the chamber to provide an annular space therebetween, milk distributing means situated within the chamber and capable of spreading the milk discharging from the inlet pipe in an evenly downwardly directed flow through said annular space, a measuring glass, a discharge pipe leading from the chamber to the measuring glass, an entrance to the discharge pipe, said inlet pipe, outlet and discharge pipe leading through the bottom of the chamber and being radially aligned across the chamber, an inner section of the outlet extends for a distance within the chamber and is formed with a slot extending downwardly from the open top of the outlet, and a metering cup set about the entrance, the area of the entrance to the metering cup being of predetermined ratio relative to the area of the annular space so that a selected quantity of milk is passed through the metering cup and discharge pipe to the measuring glass for the purpose of measuring the weight of the milk within the measuring glass against a graduated scale.

11. A metering and flow indicating device as claimed in claim 7 and wherein the valve is a spring loaded stem type normally closed on a seating about an opening leading through the bottom of the measuring glass to a return line to the milking machine system, and a valve controlled line from the outlet pipe to the return line.

References Cited

UNITED STATES PATENTS

| | | | |
|---|---|---|---|
| 3,045,493 | 7/1962 | Seaborne | 73—202 X |
| 3,088,316 | 5/1963 | Hutching. | |
| 3,250,129 | 5/1966 | Aegidius | 73—202 X |
| 3,272,010 | 9/1966 | Johnson | 73—202 |

JAMES J. GILL, *Primary Examiner.*

RICHARD C. QUEISSER, *Examiner.*

E. D. GILHOOLY, *Assistant Examiner.*